(12) United States Patent
Hirvonen et al.

(10) Patent No.: US 10,745,141 B2
(45) Date of Patent: Aug. 18, 2020

(54) ELECTRONIC RUDDER BIAS SYSTEM

(71) Applicant: Honda Patents & Technologies North America, LLC, Torrance, CA (US)

(72) Inventors: Jukka Matti Hirvonen, Oak Ridge, NC (US); Nilesh Arun Sahani, Greensboro, NC (US); Jeremy Nathaniel Montgomery, Greensboro, NC (US)

(73) Assignee: HONDA PATENTS & TECHNOLOGIES NORTH AMERICA, LLC, Torrance, CA (US)

( * ) Notice: Subject to any disclaimer, the term of this patent is extended or adjusted under 35 U.S.C. 154(b) by 179 days.

(21) Appl. No.: 15/780,676

(22) PCT Filed: Dec. 1, 2016

(86) PCT No.: PCT/US2016/064312
§ 371 (c)(1),
(2) Date: Jun. 1, 2018

(87) PCT Pub. No.: WO2017/095980
PCT Pub. Date: Jun. 8, 2017

(65) Prior Publication Data
US 2019/0009922 A1 Jan. 10, 2019

Related U.S. Application Data

(60) Provisional application No. 62/262,466, filed on Dec. 3, 2015.

(51) Int. Cl.
*B64D 31/00* (2006.01)
*B64D 31/10* (2006.01)
(Continued)

(52) U.S. Cl.
CPC .............. *B64D 31/10* (2013.01); *B64C 13/16* (2013.01); *B64C 13/503* (2013.01); *G05D 1/0808* (2013.01)

(58) Field of Classification Search
CPC .. B64D 1/00; B64D 31/10; B64C 1/00; B64C 13/00; B64C 13/16; B64C 13/503; G05D 1/00; G05D 1/0808
See application file for complete search history.

(56) References Cited

U.S. PATENT DOCUMENTS 4,935,682 A * 6/1990 McCuen .............. G05D 1/0072
 318/586
7,984,880 B2 * 7/2011 Gomes .................... B64C 13/38
 244/230

(Continued)

OTHER PUBLICATIONS

Written Opinion and International Search Report of PCT/US2016/064312 dated Feb. 16, 2017; 8 pages.

*Primary Examiner* — Yonel Beaulieu
(74) *Attorney, Agent, or Firm* — Rankin, Hill & Clark LLP

(57) ABSTRACT

A rudder bias system for an aircraft with a right engine and a left engine includes a component determining a left and right primary and secondary thrust estimates. The system includes a left engine thrust estimate selector determining a left selected estimate based on the left thrust estimates and a right engine thrust estimate selector determining a right selected estimate based on the right thrust estimates. The system includes an enable and mode component determining one or more corresponding validities for the thrust estimates. The system includes a control component generating an engage command based on a thrust differential between the right engine and the left engine, calculated from the left selected estimate and the right selected estimate and a torque command based on an equivalent pedal force assistance (Continued)

calculated as a difference between the thrust differential and an activation threshold.

15 Claims, 1 Drawing Sheet

(51) Int. Cl.
  *B64C 13/00* (2006.01)
  *G05D 1/00* (2006.01)
  *B64C 13/16* (2006.01)
  *B64C 13/50* (2006.01)
  *G05D 1/08* (2006.01)

(56) References Cited

U.S. PATENT DOCUMENTS

| | | | | |
|---|---|---|---|---|
| 8,352,099 | B1* | 1/2013 | Eggold | B64C 15/02 244/75.1 |
| 9,889,944 | B2* | 2/2018 | Schmidt | B64D 31/12 |
| 2004/0230353 | A1* | 11/2004 | Villaume | G05D 1/0083 701/3 |
| 2015/0298797 | A1* | 10/2015 | Friedel | B64C 13/16 244/78.1 |

* cited by examiner

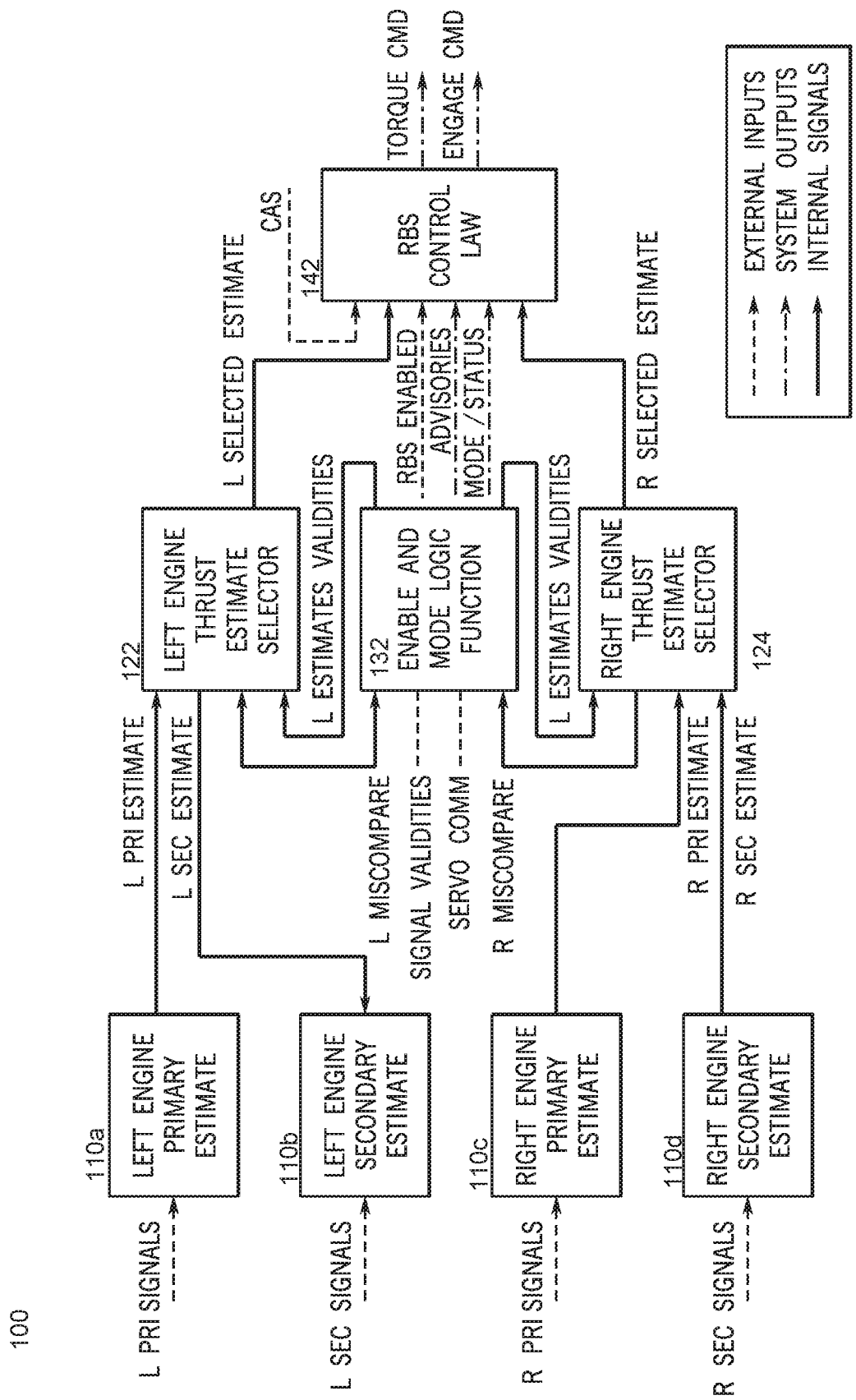

ELECTRONIC RUDDER BIAS SYSTEM

BACKGROUND

Mechanical rudder bias systems can be implemented to counteract engine failure conditions in twin engine aircraft designs. For example, a rudder bias system can include pneumatic systems that take jet engine bleed pressure from both engines and route it into a piston that is balanced in normal operation by the same amount of pressure on both sides of the piston. During an engine failure, the pressure on one side is lost, and the piston will swing and push the rudder flight control system over (i.e. biasing the rudder). However, this type of a system is always "active" and ready to deflect the rudder, even when such an operation is not desired. Furthermore, creating an accurately operating system using this type of mechanical system can be difficult. This approach can also add undesired weight to the aircraft. Other rudder boost systems have been developed to compensate for engine out situations in a twin engine aircraft. Such systems measure the pilot input force one way or another and create a force or torque proportional to the pilot input force. However, these systems require measuring the pilot input force in order to provide proportional boost function.

BRIEF DESCRIPTION

According to one or more aspects, a rudder bias system for an aircraft with a right engine and a left engine includes a component determining a left primary thrust estimate, a left secondary thrust estimate, a right primary thrust estimate, and a right secondary thrust estimate based on a left primary signal, a left secondary signal, a right primary signal, and a right secondary signal, respectively. The system includes a left engine thrust estimate selector determining a left selected estimate based on the left primary thrust estimate and the left secondary thrust estimate and a right engine thrust estimate selector determining a right selected estimate based on the right primary thrust estimate and the right secondary thrust estimate. The system includes an enable and mode component determining one or more corresponding validities for the left primary thrust estimate, the left secondary thrust estimate, the right primary thrust estimate, and the right secondary thrust estimate. The system also includes a control component generating an engage command based on a thrust differential between the right engine and the left engine, the thrust differential calculated from the left selected estimate and the right selected estimate and a torque command based on an equivalent pedal force assistance calculated as a difference between the thrust differential and an activation threshold.

In one or more embodiments, the control component generates the engage command based on the thrust differential being greater than an engagement threshold. The left secondary thrust estimate or the right secondary thrust estimate may be determined based on a calibrated airspeed (CAS) and a corresponding engine compressed gas pressure (P3). The left secondary thrust estimate or the right secondary thrust estimate may also be determined based on a first order CAS, a first order P3, and a second order P3. The left engine thrust estimate selector may determine a left miscompare based on a comparison between the left primary thrust estimate and the left secondary thrust estimate and the right engine thrust estimate selector may determine a right miscompare based on a comparison between the right primary thrust estimate and the right secondary thrust estimate. The enable and mode component may indicate a fault based on the left miscompare or the right miscompare being greater than a miscomparison threshold.

According to one or more aspects, a method for rudder biasing for an aircraft with a right engine and a left engine includes determining a left primary thrust estimate, a left secondary thrust estimate, a right primary thrust estimate, and a right secondary thrust estimate based on a left primary signal, a left secondary signal, a right primary signal, and a right secondary signal, respectively, determining a left selected estimate based on the left primary thrust estimate and the left secondary thrust estimate, determining a right selected estimate based on the right primary thrust estimate and the right secondary thrust estimate, determining one or more corresponding validities for the left primary thrust estimate, the left secondary thrust estimate, the right primary thrust estimate, and the right secondary thrust estimate, generating an engage command based on a thrust differential between the right engine and the left engine, the thrust differential calculated from the left selected estimate and the right selected estimate, and generating a torque command based on an equivalent pedal force assistance calculated as a difference between the thrust differential and an activation threshold.

The method may include generating the engage command based on the thrust differential being greater than an engagement threshold or generating the engage command based on at least one of the corresponding validities being valid. The left secondary thrust estimate or the right secondary thrust estimate may be determined based on a calibrated airspeed (CAS) and a corresponding engine compressed gas pressure (P3). The left secondary thrust estimate or the right secondary thrust estimate may be determined or calculated based on a formula: $a+b\ (CAS)+c\ (P3)+d\ (P3)^2$, wherein a, b, c, and d are polynomial coefficients. The method may include generating the engage command based on a passing system preflight test and a passing actuator preflight test, determining a left miscompare based on a comparison between the left primary thrust estimate and the left secondary thrust estimate, determining a right miscompare based on a comparison between the right primary thrust estimate and the right secondary thrust estimate, or indicating a fault based on the left miscompare or the right miscompare being greater than a miscomparison threshold.

BRIEF DESCRIPTION OF THE DRAWINGS

FIG. 1 depicts an exemplary electronic rudder bias system architecture and internal functionality, according to the present disclosure.

DETAILED DESCRIPTION

The present disclosure relates to an electronic rudder bias system 100, where calculations are done in an electronic computing element, such as a computer or other computational and configurable device (e.g., a field programmable gate array or FGPA). It will be appreciated that the exemplary rudder bias system 100 is a software system which runs in an airplane's electronic system. This electronic system hosts the rudder bias system 100 function at a much higher rate than the associated aircraft dynamics to provide rudder bias without delays. As used herein, a logic, a component, a function, a control law, an algorithm, a module, etc. refers to an implementation of one or more computer instructions, calculations, or determinations, via a processor, a processing unit, and/or a memory of a computer or other electronic hardware, such as circuitry, the FPGA, or an integrated circuit (IC), for example.

An actuator (not shown in FIG. 1) is configured to follow the commands of the electronic rudder bias system 100 according to a torque command and produce a physical force or a torque to move a rudder control surface. In contrast to known designs, the exemplary rudder bias system 100 is independent of pilot input force measurements. Instead, the rudder bias system 100 is adapted to continuously provide a bias based on the very condition it is compensating for—particularly, a thrust differential situation. The system architecture is setup in a fault tolerant manner so that the actual function is independent of pilot input forces. Moreover, the system signal routing is done in such a manner that no single event, such as a rotor burst event, can render the rudder bias system 100 inoperative. This routing can be achieved by routing one set of signals high in the airframe and another set of signals low in the airframe, so that rotor burst trajectories can only affect one set of signals, but not all signals. Although the physical locations within the airframe are not shown in FIG. 1, different signals are determined from components 110a, 110b, 110c, and 110d, and such signals can be routed around the airframe as previously described.

For both (e.g., left and right) of the two engines symmetric about an airplane's longitudinal axis, the exemplary rudder bias system 100 of FIG. 1 determines two dissimilar thrust estimates based on sets of dissimilar signals. In total, four thrust estimates (left primary, left secondary, right primary, and right secondary) are computed by components 110a, 110b, 110c, and 110d, respectively. In one or more embodiments, components 110a, 110b, 110c, 110d may be implemented as a single component or as one logic circuit. Saturation logic constrains the respective thrust estimates to upper and lower bounds, determined from maximum and minimum engine outputs expected. The rudder bias system 100 includes a secondary thrust estimate calculator (implemented within components 110b and 110d) which is based on measurements of calibrated airspeed (CAS) and engine compressed gas pressure ($P_3$). These calculations are made for each engine by components 110b and 110d. In one or more embodiments, the secondary thrust estimates include a constant, first order terms with respect to CAS and $P_3$, and a second order term with respect to $P_3$. For example, one or more components of the system 100 may use the equation below to calculate the secondary thrust estimates where a, b, c, and d represent polynomial coefficients.

$$\text{Thrust}_{Secondary} = a + b(CAS) + c(P_3) + d(P_3)^2$$

The present rudder bias system 100 relies on an enable and mode component 132 to ensure system robustness and legitimacy even when there are signal losses or servo malfunctions. The enable and mode logic function (herein enable and mode component 132) serves three purposes.

A first function of the enable and mode component 132 is to determine the availability of the rudder bias system 100. According to one or more aspects of the present disclosure, three conditions are met in order to enable the rudder bias system 100. First, at least one thrust estimate is valid. Second, the system preflight test and the actuator preflight test pass. Third, communication via at least one of the two signal paths (e.g., torque command or engage command) to the actuator are functioning properly.

A second function of the enable and mode component 132 is to instruct other components of the system which mode to be in. In other words, the enable and mode component 132 determines a mode for the system 100. The enable and mode component 132 works in tandem with thrust estimate selectors 122, 124 to prevent errant internal thrust calculations from having adverse effects on the system output. Based on the validities of the signals (e.g., one of the inputs of the enable and mode component 132) used in the individual thrust estimates (these signals or signal validities are voted on or determined outside the rudder bias system 100), the enable and mode component 132 determines a validity for each thrust estimate, and the enable and mode component 132 passes these discrete signals to the appropriate or corresponding thrust estimate selector (e.g., left engine primary and secondary estimate validities to the left engine thrust estimate selector 122 and right engine primary and secondary estimate validities to the right engine thrust estimate selector 124).

The third function of the enable and mode component 132 is to formulate signals (e.g., advisory signals, enabled signals, mode or status signals) that contain information pertaining to the health status of the rudder bias system 100. These debug parameters generated by the enable and mode component 132 characterize the operational state of the rudder bias system 100. Information provided includes the type of estimate being used by each engine, a comparison status between rudder bias system torque commanded and yaw servo measured torque, a comparison status between the thrust estimates for both engines, and a status of rudder bias system 100 communication with the yaw servo. The enable and mode component 132, moreover, may indicate a flight crew advisory message via the rudder bias system 100 using actuator fault flags in scenarios where pilot awareness may be desired. These situations can include when the rudder bias system 100 is not capable of meeting an intended function, when there is a miscomparison between the two thrust estimates of either engine, or when communication via either signal path between the system 100 and the actuator is not valid.

According to the present disclosure, the exemplary rudder bias system 100 uses two identical thrust estimate selectors—one for the left engine 122 and one for the right engine 124. These components determine thrust estimates which are passed to the control law component (herein control component 142). The estimate chosen by the thrust estimate selector 122, 124 is based on the validities of the thrust estimates which are received from the rudder bias system 100 enable and mode component 132. For a given engine, if the primary estimate is valid, the enable and mode component 132 outputs this value as the selected estimate. If the primary estimate is not valid, and the secondary estimate is valid, then the function outputs the secondary thrust estimate as the selected estimate.

In other words, if the left primary thrust estimate is valid, the left engine thrust estimate selector 122 outputs the left primary thrust estimate as the left selected estimate. If the left primary thrust estimate is invalid and the left secondary thrust estimate is valid, the left engine thrust estimate selector 122 outputs the left secondary thrust estimate as the left selected estimate. Similarly, if the right primary thrust estimate is valid, the right engine thrust estimate selector 124 outputs the right primary thrust estimate as the right selected estimate. If the right primary thrust estimate is invalid and the right secondary thrust estimate is valid, the right engine thrust estimate selector 124 outputs the right secondary thrust estimate as the right selected estimate.

If neither estimate is valid, the selected estimate is invalid and the thrust estimate selector 122, 124 interprets the total loss of all signals as a loss of a corresponding engine, outputting zero or no thrust. The thrust estimate selector 122, 124 also compares the primary and secondary estimates (e.g., for both left and right engines). If the difference between the two is greater than a miscomparison threshold, a miscompare flag is routed back to the rudder bias system 100 enable and mode component 132 to engender a fault (though such a miscomparison does not necessarily prevent rudder bias system 100 engagement).

The control component 142 of the exemplary rudder bias system 100 implements an airspeed based algorithm to determine an engagement threshold. In this way, the control component 142 allows for the ability to lessen or inhibit the rudder bias system 100 authority at speeds where assistance is not needed to control the airplane. Without assistance in these situations, reasonable workloads are required by the pilot; thus, no need exists to increase the load on the flight controls system. This characteristic is especially desired at taxi speeds where interactions with ground dynamics would require frequent pedal modulation to control the airplane with one engine inoperative. The enable and mode component 132 calculates both an activation and deactivation threshold value for each iteration, one of which is selected as the engagement threshold. The engagement threshold is the activation threshold value when the rudder bias system 100 was not engaged in the previous iteration and the deactivation threshold value when the rudder bias system 100 was engaged at the previous iteration. Both the activation and deactivation values can be scheduled via 1-D interpolation. At low taxi speeds, these values are scheduled to be at a constant thrust value slightly above the maximum thrust estimate. At high taxi speeds and flight speeds, these values are also constant, though biased by a small hysteresis. At speeds in between the two constant regions, the two threshold schedules are linear, which effectively fades in the engagement threshold.

The control component 142 calculates an equivalent pedal force value intended to bias the pilot's control input in the yaw axis of the primary flight control system. This assistance can be scheduled via 1-D interpolation as a function of the difference between the thrust differential and the aforementioned activation threshold (note: activation threshold, not the engagement threshold). The assist schedule outputs zero pounds of assistance (and does not send a rudder bias system 100 engagement command) when the thrust differential is below the activation threshold; when this difference, however, is positive (e.g., the thrust differential>activation threshold), the control component 142 sets the rudder bias system 100 engage command to high, and the assistance increases linearly, up to a maximum value. According to one aspect, the equivalent pedal force schedule in the control component 142 is determined such that the rudder bias system 100 would lessen the required pilot workload to desired pedal force levels to balance an asymmetric thrust induced yawing moment. Based on the calculated equivalent pedal force assistance, the control component 142 of the exemplary rudder bias system 100 determines a torque command to send to the rudder actuator. This statics based calculation uses the rudder gearing ratio to convert the commanded pedal bias to a commanded rudder hinge moment. Then, via the rudder to actuator gearing ratio, this commanded rudder hinge moment is converted to an actuator torque command.

FIG. 1 illustrates how the exemplary rudder bias system 100 interfaces with external inputs, how internal functions interact with one another, and how system outputs originate. System functionality naturally flows from the system inputs at the left of FIG. 1 to the composition elements of the rudder bias system 100 described above. From the composition elements, the various system outputs, statuses, and commands are determined. The enable and mode component 132 of FIG. 1 is the status monitor of the system 100, and inspects inputs, generates outputs, determines system capabilities, and interfaces with most of the other components of the system 100.

As shown in FIG. 1, four thrust estimates are determined from the external inputs (e.g., left primary signals, left secondary signals, right primary signals, right secondary signals), which are measured quantities pertaining to corresponding engine parameters and air data. These estimates are sent to estimate selectors 122, 124 which select an estimate for each engine based on the validities of the various estimates as determined by the enable and mode component 132. The enable and mode component 132 uses the validities (e.g., which are inputted externally) for the various measured quantities to determine which estimates are valid.

The enable and mode component 132 also outputs various advisory flags and rudder bias system 100 status parameters which provide insight into the rudder bias system 100 mode of operation and health of the system. Inputted into the control component 142 of the rudder bias system 100, are the two selected thrust estimates, the capability of the system, and calibrated airspeed (CAS). The control component 142 determines engagement thresholds using its speed based threshold algorithm. If the thrust differential between the two engines is above the engagement threshold, an engage command is triggered, and an equivalent pedal force to augment the pilot's input is calculated. Statics are used to turn the equivalent pedal assist value into a torque command to be sent to the yaw servo.

One aspect of the electronic rudder bias system 100 is to augment the pilot's pedal input during asymmetric thrust conditions such that a pilot workload for additional input towards the operating engine required to trim the aircraft at no angle of roll is reduced to an adjustable desired level (e.g., 30-80 lbs. of residual pedal force). The present rudder bias system 100 ensures that at the onset of an engine failure, the rudder bias system 100 will not provide an 'overboost'—a torque command that would require the pilot to input pedal towards the failed engine side—which is not an ordinary pilot action and would likely cause confusion in the cockpit. With the rudder bias system 100, moreover, the pilot has multiple options which he or she could trim the aircraft for steady, constant heading flight, including a small amount of roll angle, a small amount of rudder trim tab, or a small amount of rudder pedal input force.

The independence from pilot input force measurements allows the exemplary rudder bias system 100 to provide a bias for the very condition it is compensating for (e.g., a thrust differential situation). The spatial separation used in the signal routing ensures that no single event failure can render the rudder bias system 100 inoperative. This architecture, moreover, means rotor burst trajectories can only affect one set of signals (e.g., one of the signals for components 110a, 110b, 110c, or 110d), thereby enabling the system 100 to be remain fully operational during a rotor burst scenario.

The speed based engagement threshold algorithm allows for the present rudder bias system 100 to be inhibited or for its authority to be reduced at taxi speeds where the load required to deflect the rudder to the stop is significantly reduced. Full rudder deflection, moreover, might provide too much of an overcorrection due to the interaction of elements such as nose wheel steering. Overcorrection has the potential to require the pilot to fight the rudder bias to aggressively modulate his input. Without assistance in these situations, reasonable workloads (e.g., the aforementioned desired forces at the pedal) are required by the pilot to control the aircraft; no need, thus, exists to increase the load on the flight controls system.

The use of dissimilar thrust estimator functions (e.g., implemented by selectors 122 and 124) that consume dissimilar signals to compute independent estimates for a given engine broadens the availability of the exemplary rudder bias system 100 in the presence of faults and failures in the aircraft as a whole and allows for the system to be less susceptible to loss links and errant measurements. Coupled with the enable and mode component 132 serving as a system monitor, the present rudder bias system 100 is robust with a high degree of legitimacy. Because the secondary thrust estimate may be calculated as a function from measured calibrated airspeed and engine compressed gas pressure derived from empirical data, the system 100 is an accurate predictor of thrust in steady thrust situations, which results in much more precise system performance compared to a purely mechanical implementation.

As is evident from the foregoing, the exemplary electronic rudder bias system 100 is more configurable than a typical mechanical implementation of a rudder bias system. The rudder bias system 100 is independent of the pilot input forces and operates even when the primary mechanical flight control cables are cut (e.g. due to a rotor burst scenario). The exemplary rudder bias system 100 utilizes spatial separation where system signals are routed through different zones that cannot be damaged by a single event (e.g. a rotor burst event). The determination of two dissimilar thrust estimates is based on sets of dissimilar signals for each engine.

The secondary thrust estimate calculator of the rudder bias system 100 provides a polynomial relationship derived from actual data that contains a constant, first order terms with respect to calibrated airspeed and engine compressed gas pressure (P3), and a second order term with respect to P3.

The enable and mode component 132 determines the availability of the rudder bias system 100, dictates the modes of various internal functions, and provides operational status information including flags for potential advisory notices. Thrust estimate selectors 122, 124 ensure validly calculated thrust estimates (e.g., estimates calculated based on valid signals) are utilized by the rudder bias system 100. This prevents improper rudder bias system 100 commands from using errant internal thrust values.

An airspeed based engagement threshold algorithm lessens and/or inhibits the rudder bias system 100 control authority at speeds where large rudder bias assists are not needed or even desired to control the airplane. The present system 100 mitigates the presence of large loads on the flight controls system through which the pilot would have to oppose to modulate his input. The rudder bias system 100 control component 142 determines an equivalent pedal force to assist the pilot as a function of thrust differential between the two engines (e.g., left and right). This assistance lessens the required pilot workload to a desired customizable level (such as 30-80 pounds) at the pedal to balance an asymmetric thrust induced yawing moment. The exemplary rudder bias system 100 provides for the static based conversion of a commanded pedal input load to a commanded rudder hinge moment (via the rudder gearing ratio) to a commanded actuator torque (via the yaw actuator gearing ratio).

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A rudder bias system for an aircraft with a right engine and a left engine, comprising:
   a component determining a left primary thrust estimate, a left secondary thrust estimate, a right primary thrust estimate, and a right secondary thrust estimate based on a left primary signal, a left secondary signal, a right primary signal, and a right secondary signal, respectively;
   a left engine thrust estimate selector determining a left selected estimate based on the left primary thrust estimate and the left secondary thrust estimate;
   a right engine thrust estimate selector determining a right selected estimate based on the right primary thrust estimate and the right secondary thrust estimate;
   an enable and mode component determining one or more corresponding validities for the left primary thrust estimate, the left secondary thrust estimate, the right primary thrust estimate, and the right secondary thrust estimate;
   a control component generating:
      an engage command based on a thrust differential between the right engine and the left engine, the thrust differential calculated from the left selected estimate and the right selected estimate; and
      a torque command based on an equivalent pedal force assistance calculated as a difference between the thrust differential and an activation threshold.

2. The system of claim 1, wherein the control component generates the engage command based on the thrust differential being greater than an engagement threshold.

3. The system of claim 1, wherein the left secondary thrust estimate or the right secondary thrust estimate are determined based on a calibrated airspeed (CAS) and a corresponding engine compressed gas pressure (P3).

4. The system of claim 3, wherein the left secondary thrust estimate or the right secondary thrust estimate is determined based on a first order CAS, a first order P3, and a second order P3.

5. The system of claim 1, wherein the left engine thrust estimate selector determines a left miscompare based on a comparison between the left primary thrust estimate and the left secondary thrust estimate; and
   the right engine thrust estimate selector determines a right miscompare based on a comparison between the right primary thrust estimate and the right secondary thrust estimate.

6. The system of claim 1, wherein the enable and mode component indicates a fault based on the left miscompare or the right miscompare being greater than a miscomparison threshold.

7. A method for rudder biasing for an aircraft with a right engine and a left engine, comprising:
   determining a left primary thrust estimate, a left secondary thrust estimate, a right primary thrust estimate, and a right secondary thrust estimate based on a left primary signal, a left secondary signal, a right primary signal, and a right secondary signal, respectively;
   determining a left selected estimate based on the left primary thrust estimate and the left secondary thrust estimate;

determining a right selected estimate based on the right primary thrust estimate and the right secondary thrust estimate;

determining one or more corresponding validities for the left primary thrust estimate, the left secondary thrust estimate, the right primary thrust estimate, and the right secondary thrust estimate;

generating an engage command based on a thrust differential between the right engine and the left engine, the thrust differential calculated from the left selected estimate and the right selected estimate; and generating a torque command based on an equivalent pedal force assistance calculated as a difference between the thrust differential and an activation threshold.

8. The method of claim 7, comprising generating the engage command based on the thrust differential being greater than an engagement threshold.

9. The method of claim 7, comprising generating the engage command based on at least one of the corresponding validities being valid.

10. The method of claim 7, wherein the left secondary thrust estimate or the right secondary thrust estimate are determined based on a calibrated airspeed (CAS) and a corresponding engine compressed gas pressure (P3).

11. The method of claim 10, wherein the left secondary thrust estimate or the right secondary thrust estimate is determined based on a formula: $a+b(CAS)+c(P3)+d(P3)^2$, wherein a, b, c, and d are polynomial coefficients.

12. The method of claim 7, comprising generating the engage command based on a passing system preflight test and a passing actuator preflight test.

13. The method of claim 7, comprising determining a left miscompare based on a comparison between the left primary thrust estimate and the left secondary thrust estimate.

14. The method of claim 7, comprising determining a right miscompare based on a comparison between the right primary thrust estimate and the right secondary thrust estimate.

15. The method of claim 7, comprising indicating a fault based on a left miscompare or a right miscompare being greater than a miscomparison threshold.

* * * * *